US008390889B2

(12) United States Patent
Iguchi

(10) Patent No.: US 8,390,889 B2
(45) Date of Patent: Mar. 5, 2013

(54) IMAGE PROCESSING APPARATUS AND METHOD THEREOF

(75) Inventor: Ryosuke Iguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1459 days.

(21) Appl. No.: 11/615,109

(22) Filed: Dec. 22, 2006

(65) Prior Publication Data

US 2007/0146752 A1    Jun. 28, 2007

(30) Foreign Application Priority Data

Dec. 28, 2005    (JP) .................................. 2005-380173

(51) Int. Cl.
  *G06F 15/00*    (2006.01)
  *G06F 3/12*    (2006.01)
  *G06K 1/00*    (2006.01)
  *G06K 15/00*    (2006.01)
  *G06K 9/00*    (2006.01)
  *G06K 9/36*    (2006.01)
  *G03F 3/10*    (2006.01)
  *H04N 1/40*    (2006.01)

(52) U.S. Cl. ...... 358/3.01; 358/1.9; 358/1.18; 358/1.13; 358/527; 382/167; 382/276

(58) Field of Classification Search .................. 358/1.9, 358/1.18, 1.13, 500, 537, 527, 518, 519, 358/3.01, 3.23; 345/153, 690, 214, 589, 345/596; 382/167, 272, 274.276, 302
See application file for complete search history.

(56) References Cited

U.S. PATENT DOCUMENTS

| 6,424,752 | B1 * | 7/2002 | Katayama et al. ............ 382/284 |
| 6,814,420 | B2 * | 11/2004 | Fujita et al. ..................... 347/15 |
| 7,161,712 | B2 * | 1/2007 | Maruta et al. .................. 358/1.9 |
| 7,349,111 | B2 * | 3/2008 | Horii ............................. 358/1.13 |
| 7,397,572 | B1 * | 7/2008 | Horii ............................. 358/1.13 |
| 7,599,096 | B2 * | 10/2009 | Yoshida ........................ 358/3.01 |
| 7,623,141 | B2 * | 11/2009 | Brown Elliott et al. ...... 345/690 |
| 7,684,063 | B2 * | 3/2010 | Fujita et al. .................. 358/1.13 |
| 2003/0063145 | A1 | 4/2003 | Fujita et al. ..................... 347/15 |
| 2004/0227977 | A1 | 11/2004 | Yoshida |
| 2005/0057765 | A1 | 3/2005 | Fujita et al. .................... 358/1.9 |
| 2007/0171978 | A1 * | 7/2007 | Chono ..................... 375/240.18 |

FOREIGN PATENT DOCUMENTS

| JP | 3-178267 | 8/1991 |
| JP | 2773188 | 4/1998 |

(Continued)

OTHER PUBLICATIONS

Office Action, dated Nov. 25, 2008, in JP 2005-380173.

*Primary Examiner* — Twyler Haskins
*Assistant Examiner* — Jonathan Beckley
(74) *Attorney, Agent, or Firm* — Fitzpatrick, Cella, Harper & Scinto

(57) ABSTRACT

This invention provides a sample print which allows the user to easily set color adjustment parameters. To this end, upon outputting images which undergo color processing using a plurality of different parameter sets, a sample print mode of parallelly outputting a reference image and images which have different parameter sets of the image processing from the reference image, and are arranged around the reference image, and a sample print mode of parallelly outputting the reference image which is arranged at a corner of an image group including images in a specific hue direction, and images which have different parameter sets of the color processing from the reference image and are arranged between the corner and other corners, are prepared.

14 Claims, 15 Drawing Sheets

FOREIGN PATENT DOCUMENTS

| JP | 2000-255115 | 9/2000 |
| JP | 2002-027222 | 7/2002 |
| JP | 2004-142423 | 5/2004 |
| JP | 2004-214724 | 7/2004 |

* cited by examiner

F I G. 7
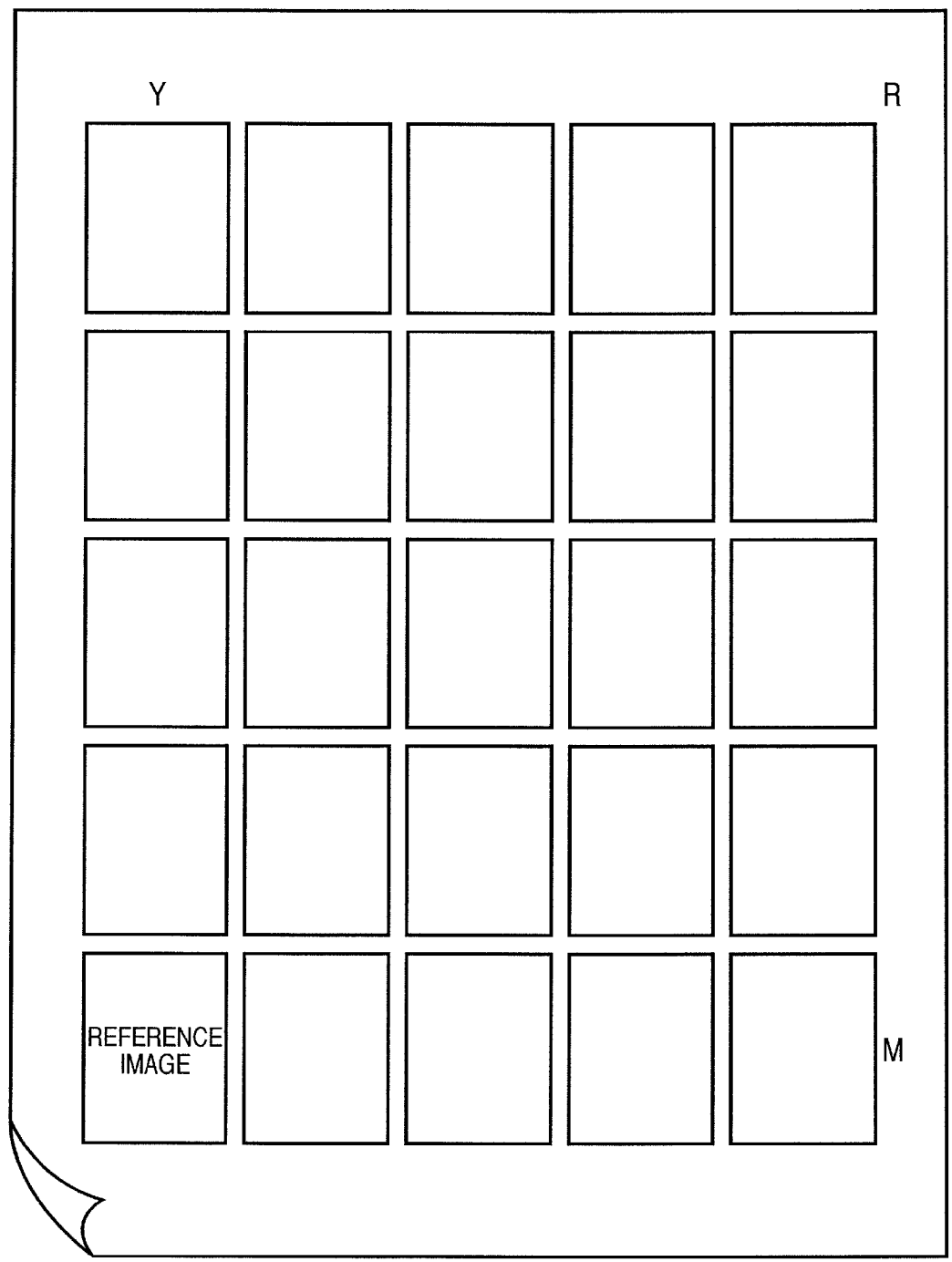

F I G. 13
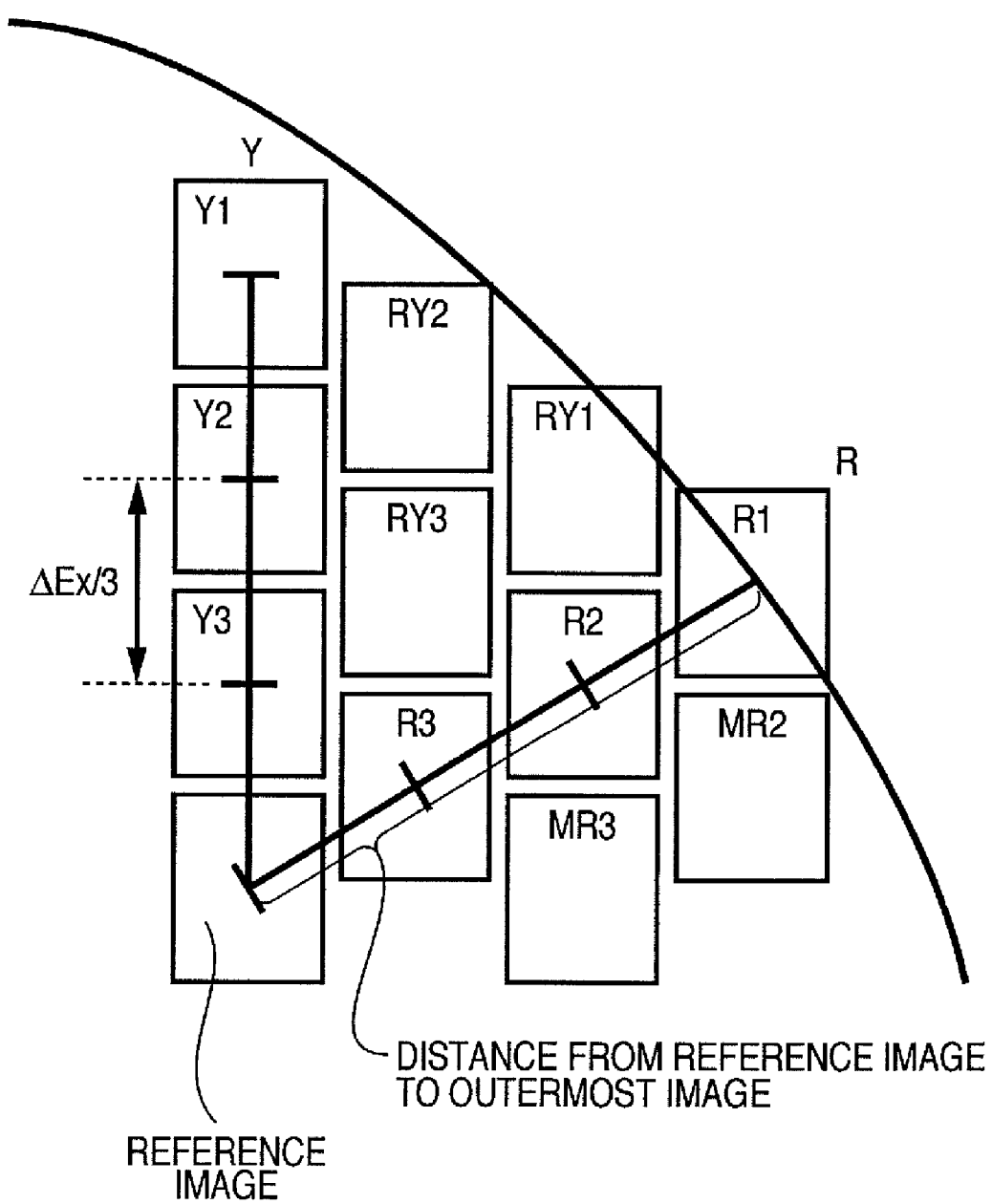

IMAGE PROCESSING APPARATUS AND METHOD THEREOF

BACKGROUND OF THE INVENTION

1. Field of the Invention

The present invention relates to an image processing apparatus and method thereof and, more particularly, to settings of color processing parameters.

2. Description of the Related Art

In recent years, the prevalence of digital cameras has facilitated digitization of photos. As a result, the frequency of handling photo image data on personal computers is on the rise. Furthermore, the prevalence of ink-jet printers now allows easy photo printing from photo image data. Moreover, the prevalence of application software used to correct and modify images allows to freely execute image processing on personal computers. For example, color adjustment is made by adding cyan as a complementary color to a reddish image, or correction is applied to the brightness of an image including a dark object image due to backlight to increase the brightness of the object image.

In monochrome printing, the tone is very important for the finish of a print. In monochrome printing, a warm black tone of an entirely yellowish image, a cold black tone of an entirely bluish image, and the like are generally known. That is, the tone to which the gray balance is biased largely changes the impression of a print image. For this reason, a system which can easily adjust the gray balance to the tone that the user wants is demanded.

In recent years, the color reproductivity of printers has improved to allow color adjustment with high precision. The user sets parameters required to perform color adjustment (color adjustment parameters) and can finish a print image to have a desired tone. However, it is very difficult to simultaneously set a plurality of color adjustment parameters.

As a method of setting a desired tone, a plurality of color adjustment parameters are set in a plurality of levels, and color processing is applied to a source image (original image) using combinations of color adjustment parameters of respective levels. A plurality of images processed based on different combinations of color adjustment parameters are laid out on one page and are printed. The user observes respective images (index images) of a sample print, and selects an index image with a desired tone, thus setting the color adjustment parameters.

Upon printing an image without color adjustment, a print image with color reproduction unique to a printer is obtained. The color reproductivity largely varies depending on printer models, and also varies depending on environmental conditions (temperature, humidity, and the like) and the degree of wear of a printhead. Furthermore, the color reproductivity largely varies depending on the combinations of print paper types and color materials (inks or toners). In other words, in order to realize the color reproductivity that the user wants, color adjustment according to the printer models, environments, print paper types, and color materials is indispensable.

FIG. 1 shows an example of a user interface (UI) of application software or a printer driver, which has a function of setting a plurality of color adjustment parameters. With this function, the user can adjust the tone of an image to obtain a print image with a desired tone according to the printer models, environments, print paper types, and color materials. The UI shown in FIG. 1 has a slider bar used to adjust color in the direction of red or cyan, a slider bar used to adjust color in the direction of green or magenta, and a slider bar used to adjust color in the direction of blue or yellow.

The user adjusts the tone of a print image by operating the sliders shown in FIG. 1. The user then instructs the application software or printer driver to output a sample print as a target for the tone adjustment result. The application software or printer driver outputs a sample print to have an image to which the color adjustment parameters designated by the operations of the slider bars are applied as a reference image. Therefore, index images which are processed based on the specific combinations of the color adjustment parameters set in a plurality of levels to have the current color adjustment parameters as the center are arranged around the reference image.

The user observes the sample print to select an index image with a desired tone, and sets the color adjustment parameters by, e.g., inputting the number of the index image of interest to the UI. When there is no index image with the tone that the user desires, the color adjustment parameters that the user desires fall outside the range of the combinations of the color adjustment parameters used to output the sample print. In this case, the user selects an index image which has a tone approximate to the desired tone, and sets the color adjustment parameters by, e.g., inputting the number of that index image. After that, the user instructs to output a sample print again. As a result, the image to which the set color adjustment parameters are applied is used as a reference image, and a sample print including index images obtained by changing the color adjustment parameters to have that image as the center can be output.

Japanese Patent Laid-Open No. 2002-027222 discloses a technique which determines the color adjustment direction on a chromaticity coordinate plane after a primary sample print, and then outputs a secondary sample print based on a fine adjustment level count. That is, the primary sample print uses a two-dimensional layout based on chromaticity coordinate parameters a* and b*. The secondary sample print after the designation of the color adjustment direction (hue value) uses a two-dimensional layout based on lightness L* and saturation S as parameters. However, since this method uses the layout based on the lightness and saturation to obtain the secondary sample print, the hue value must be accurately set in the stage of the primary sample print. In other words, the secondary sample print cannot print index images obtained by finely adjusting the hue value. For this reason, the user searches index images with the fixed hue values for one with a desired tone.

Japanese Patent No. 2773188 discloses sample printing (mosaic monitor mode) in a digital color copying machine. This technique performs sample printing by calculating color adjustment parameters of a plurality of levels upon applying predetermined arithmetic operations to reference values. Then, this technique performs sample printing again by setting the color adjustment parameters of the index image selected by the user as reference values for the next color adjustment arithmetic operations. However, Japanese Patent No. 2773188 does not describe sample printing that considers so that the user can easily recognize the hue and saturation values, and cannot easily set the color adjustment parameters in association with the hue and saturation values.

With this technique, when the user selects an index image corresponding to the maximum values of the color adjustment parameters, these maximum values of the color adjustment parameters are set as reference values. In this case, the arrangement of index images on a sample print to be printed again may not be easy for the user to see, and a measure against such selection is not disclosed.

SUMMARY OF THE INVENTION

The first aspect of the present invention discloses an image processing apparatus comprising: an input section, arranged to input a reference parameter set of color processing; a setting section, arranged to set a plurality of varied parameter sets obtained by changing parameters of the reference parameter set by a predetermined method to have the parameters as the center; and an image processor, arranged to lay out, on one page, a reference image generated by applying the color processing using the reference parameter set to an image, and a plurality of index images generated by applying the color processing using the plurality of varied parameter sets to the image, so as to output image data of the layout image to an image output device, wherein the layout includes a first layout on which the reference image is arranged at nearly the center of the page, and the plurality of index images are arranged around the reference image in accordance with the varied parameters, and a second layout on which the reference image is arranged at a corner of the page, and the plurality of index images are arranged between the corner and other corners of the page in accordance with the varied parameters, and the first layout and the second layout are selectively used.

The second aspect of the present invention discloses an image processing method of outputting images which undergo color processing using a plurality of different parameter sets, the method comprising the steps of: parallelly outputting a reference image and images which have different parameter sets of the image processing from the reference image, and are arranged around the reference image; and parallelly outputting the reference image which is arranged at a corner of an image group including images in a specific hue direction, and images which have different parameter sets of the color processing from the reference image and are arranged between the corner and other corners, wherein a step width of the parameter sets between neighboring images in the second outputting step is smaller than a step width between neighboring images in the first outputting step.

According to the present invention, color processing parameters associated with hue and saturation can be easily set.

The third aspect of the present invention discloses an image processing method of outputting images which undergo color processing using a plurality of different parameter sets, the method comprising the steps of: parallelly outputting a reference image and images which have different parameter sets of the image processing from the reference image, and are arranged around the reference image; and parallelly outputting the reference image which is arranged at a corner of an image group including images in a specific hue direction, and images which have different parameter sets of the color processing from the reference image and are arranged between the corner and other corners, wherein a step width of the parameter sets between neighboring images in the second outputting step is smaller than a step width between neighboring images in the first outputting step, wherein when a first parameter included in the parameter set exceeds a predetermined range, the first parameter is limited to fall within the predetermined range, and a second parameter which is included in the parameter set and is different from the first parameter is adjusted.

In consideration of a case wherein the color processing parameters fall outside a settable range, the color processing parameters can be set.

Further features of the present invention will become apparent from the following description of exemplary embodiments with reference to the attached drawings.

BRIEF DESCRIPTION OF THE DRAWINGS

FIG. 7 is a view for explaining the format of a sample print of the second type;

FIG. 13 is a view for explaining the distance from the reference image to an outermost index image;

DESCRIPTION OF THE EMBODIMENTS

Image processing according to preferred embodiments of the present invention will be described in detail hereinafter with reference to the accompanying drawings.

First Embodiment

[Arrangement of Image Proccessing Apparatus]

Figure 2:
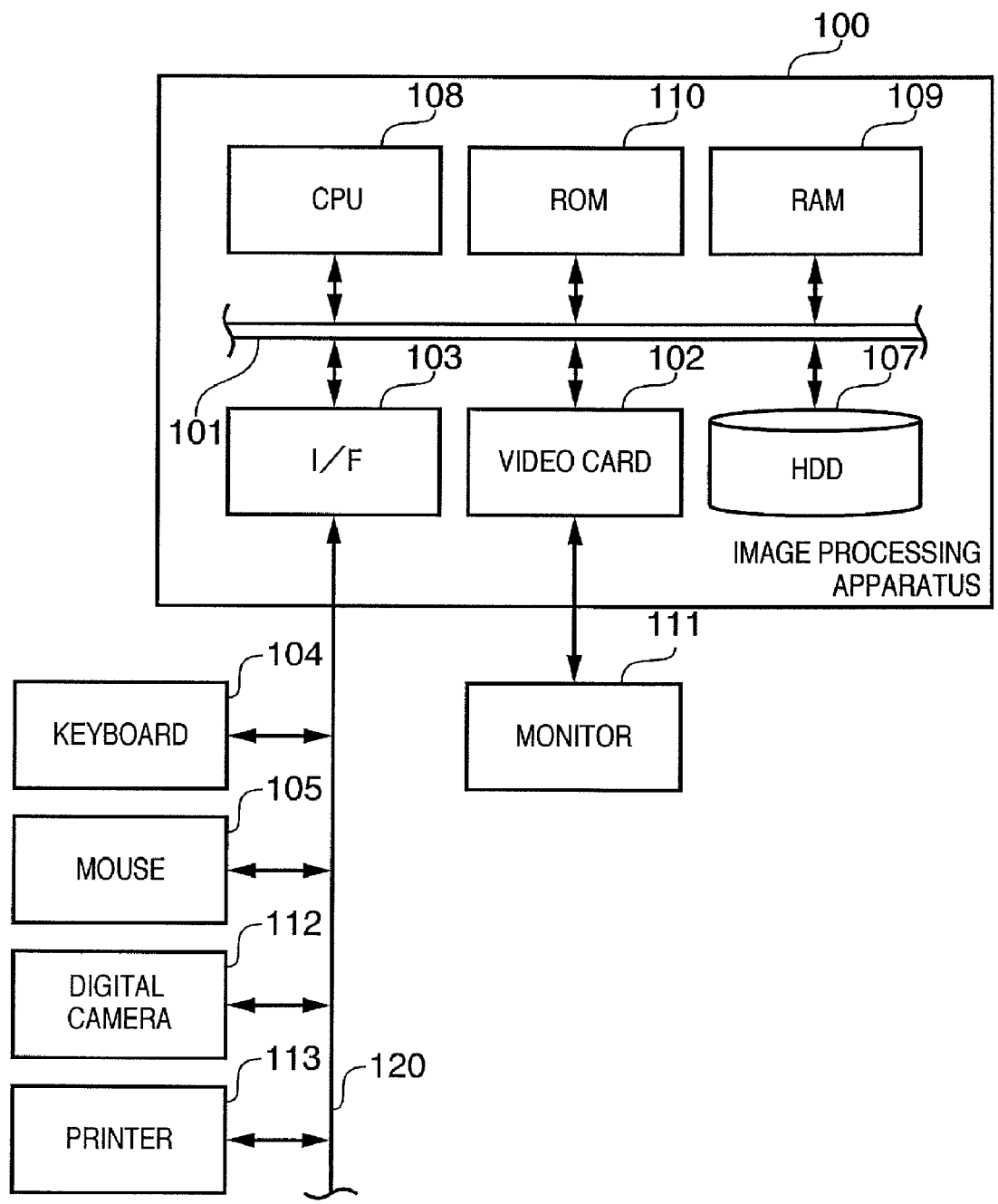
FIG. 2 is a block diagram showing the arrangement of an image processing apparatus according to an embodiment of the present invention.

FIG. 2 is a block diagram showing the arrangement of an image processing apparatus 100 according to this embodiment.

A CPU 108 implements image processing to be described later and controls respective components via a system bus 101 by executing programs stored in a ROM 110 and a hard disk drive (HDD) 107 using a RAM 109 as a work memory.

The CPU 108 displays a graphical user interface (GUI), which is used to designate execution of various kinds of processing and control and display the execution status and execution result on a monitor 111 via a video card 102. The user inputs instructions to the CPU 108 via the GUI by operating a keyboard 104 and mouse 105.

An interface (I/F) 103 is that for a serial bus such as USB (Universal Serial Bus), IEEE1394, and the like. The I/F 103 receives a user input from the keyboard 104 or mouse 105 via a serial bus 120 and transmits it to the CPU 108. To the serial bus 120, a digital camera 112 and printer 113 can be connected. Therefore, the CPU 108 can input and output image data by communicating with the digital camera 112 via the I/F 103 and serial bus 120. Also, the CPU 108 can transmit image data to be printed to the printer 113 by communicating with it via the I/F 103 and serial bus 120.

Note that the image processing apparatus 100 can be implemented by supplying various programs including an operating system (OS) and driver software to a general-purpose personal computer and making the computer execute the programs.

Figure 3:
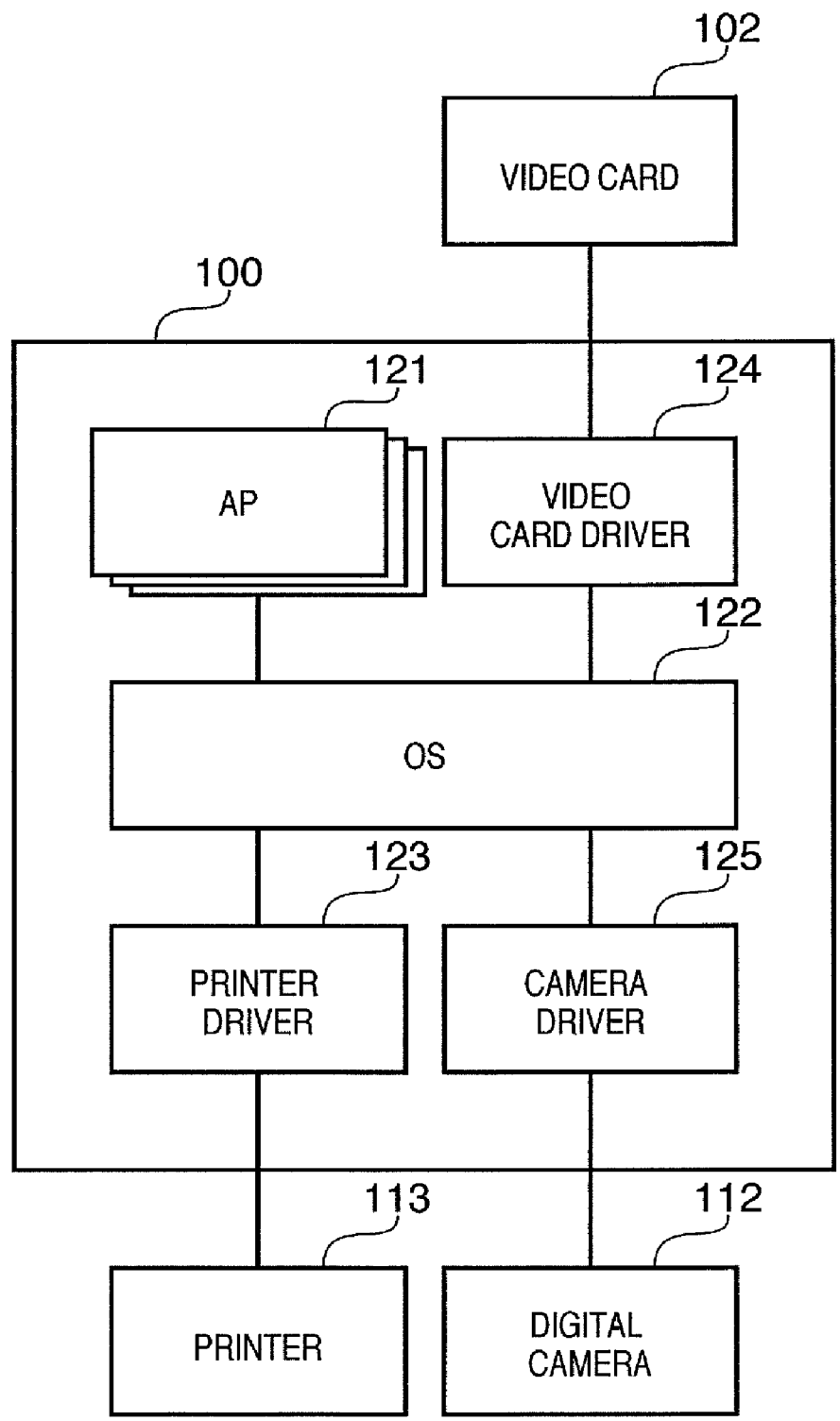
FIG. 3 is a functional block diagram of the image processing apparatus.

FIG. 3 is a functional block diagram of the image processing apparatus 100, and shows functions provided when the CPU 108 executes programs including the OS and various kinds of drivers, which are stored in the ROM 110 and HDD 107.

Under the control of an OS 122, the CPU 108 can execute various kinds of application software (AP) 121. A video card driver 124 is software used when the OS 122 controls the video card 102, generates display data, and supplies it to the video card 102. A printer driver 123 is a software used when the OS 122 communicates with the printer 113, generates print data, and transmits it to the printer 113. A camera driver 125 is software used when the OS 122 communicates with the digital camera 112 and exchanges image data.

[Operation of Image Processing Apparatus]

The application software 121 includes various kinds of software such as image processing, a wordprocessor, a spreadsheet, a Web browser, and the like. The OS 122 supplies various rendering commands (a text rendering command, graphics rendering command, image rendering command, and the like) issued by the application software 121 to the video card driver 124 and printer driver 123 to generate display data and print data.

The image processing software displays an image on the monitor 111, and edits and modifies text data such as characters and the like, graphics data such as figures and the like, and image data such as photo images and the like in accordance with user's instructions. The image processing software requests the OS 122 to print the edited and modified image data in accordance with a user's instruction. In this case, the image processing software issues to the OS 122 a rendering command group including a text rendering command for text data, a graphics rendering command for graphics data, and an image rendering command for image data.

Upon reception of a print request, the OS 122 supplies the rendering command group to the printer driver 123. Upon reception of the print request, the printer driver 123 receives and processes the rendering command group to generate print data which can be printed by the printer 113, and transmits the print data to the printer 113.

The printer driver 123 sequentially applies image correction and renders the received rendering commands, and stores the rendered commands in an RGB 24-bit page memory assured on, e.g., the RAM 109. Upon completion of rendering of the rendering commands, the printer driver 123 converts the image data on the page memory into a data format that can be printed by the printer 113, e.g., CMYK data, and transmits the CMYK data to the printer 113. Note that the printer driver 123 may execute printing in band units obtained by dividing a page into bands having a predetermined width in place of printing in page units using the page memory.

[Color Adjustment]

Image data sensed by the digital camera 112 is normally recorded and stored in an SRAM of a memory card. The user can fetch the image data onto the HDD 107 of the image processing apparatus 100 via the camera driver 125 of the image processing apparatus 100. Of course, the user may connect a card reader to the serial bus 120, and may directly read out the image data from the memory card. The user then launches the image processing software, and adjusts the color balance of the image data fetched onto the HDD 107. Also, the user can execute similar image processing using the printer driver 123.

Note that the image data of the digital camera 112 is normally recorded and stored as YCbCr signals in the JPEG format. On the other hand, the image processing apparatus 100 handles image data as RGB signals. Therefore, the JPEG image data fetched from the digital camera 112 is temporarily converted into bitmap image data of RGB signals before image processing.

Figure 1:
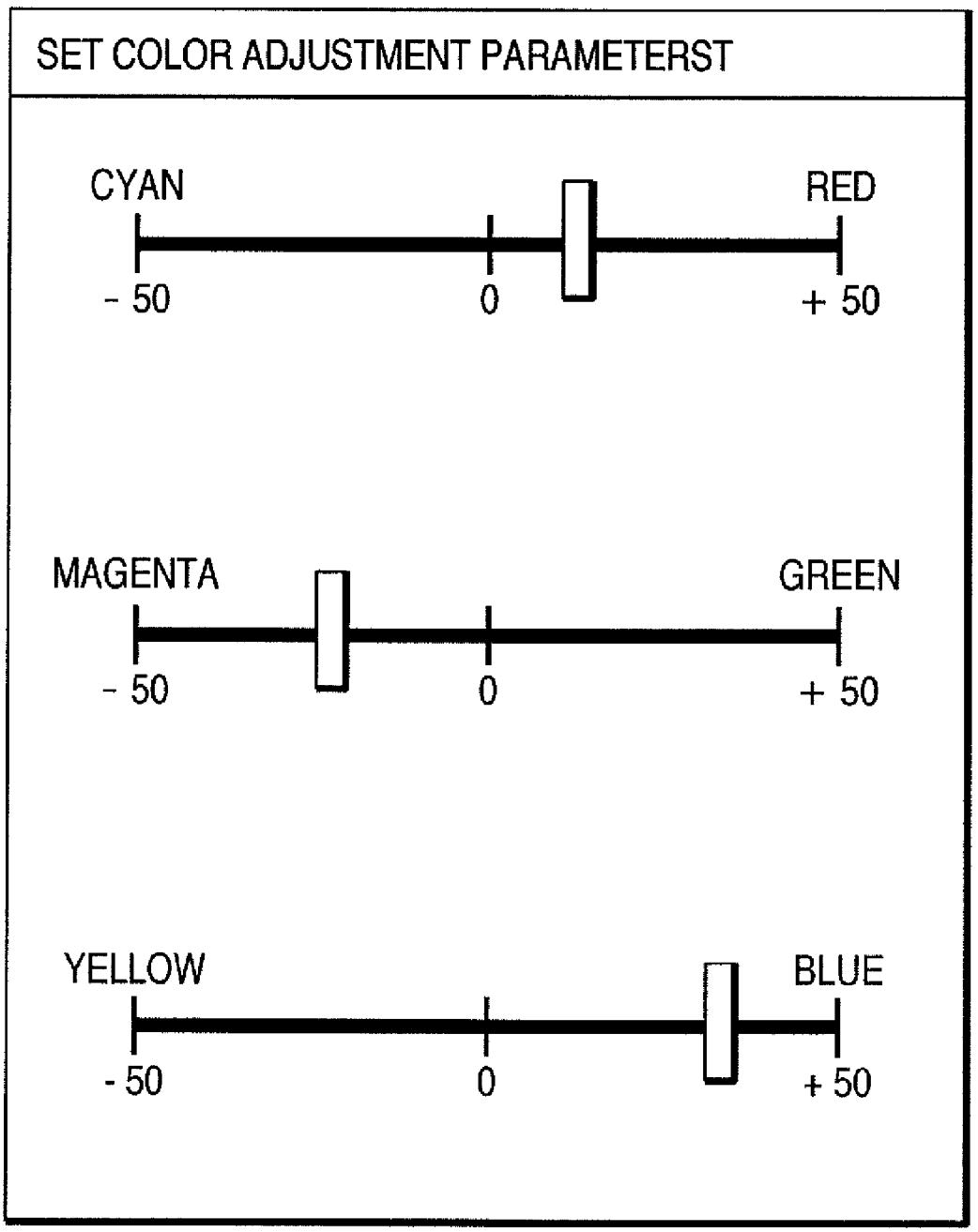
FIG. 1 shows an example of a user interface.

An example in which a red-cyan value (RC value), green-magenta value (GM value), and blue-yellow value (BY value) are used as color adjustment parameters (color processing parameters) will be described hereinafter. The application software 121 or printer driver 123 allows the user to adjust the color adjustment parameters via the GUI that displays the slider bars, as shown in FIG. 1. The user can also directly input the values of the color adjustment parameters by inputting numerical values using the keyboard 104.

Figure 4:
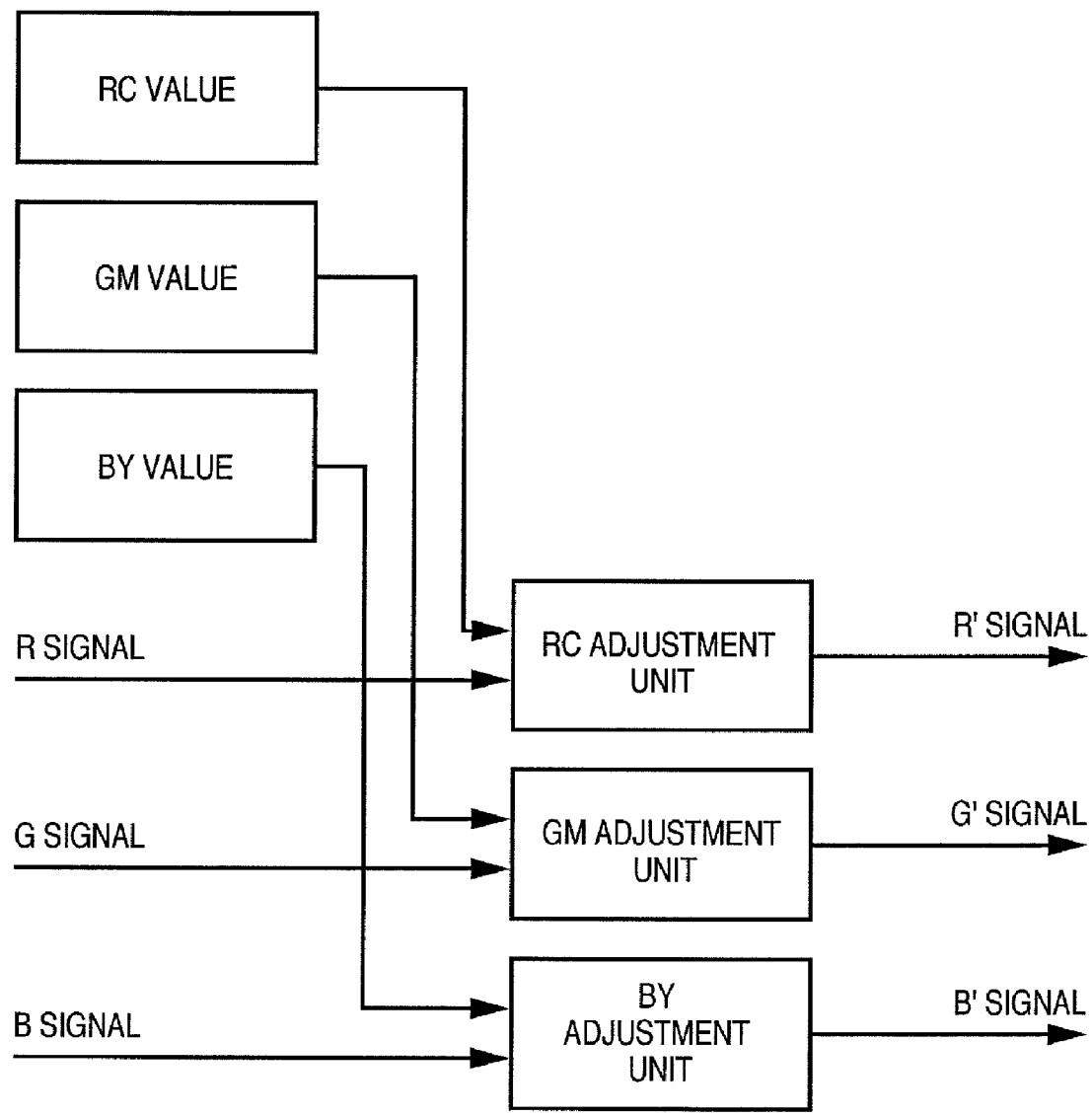
FIG. 4 shows a state wherein respective color components of RGB signals are independently set by color adjustment parameters.

FIG. 4 shows a state wherein the respective color components of RGB signals are independently processed by respective color adjustment parameters. That is, as shown in FIG. 4, of RGB signals of a reference image, an R signal is processed by an RC value, a G signal is processed by a GM value, and a B signal is processed by a BY value, thus consequently obtaining R'G'B' signals. The arithmetic operation method of the R'G'B' signals is not particularly limited. For example, in case of an R signal=150 (8 bits) and an RC value=30, the following arithmetic operations may be made.

$$R'=R+RC=150+30=180$$

or $$R'=R\times(1+RC/\text{Range})=150\times1.3=195$$

Alternatively, using the RC value as a gamma value, $$R'=R/255^{(1+RC/\text{Range})}\times255=150/255^{1/1.3}\times255=169$$

where when $0 \leq R'$ or $R' \geq 255$, the signal value is clipped to $R'=0$ or $R'=255$, and Range is the absolute value of the range of the color adjustment parameter (for example, 100 if the color adjustment parameter ranges from −50 to +50).

When the user applies the above color adjustment to an image to be printed, he or she adjusts respective color adjustment parameters while observing the tone of the printed image. However, it is difficult for a normal user to appropriately set a plurality of color adjustment parameters at one time unless he or she were an expert user. Hence, the user makes the aforementioned sample print, and then sets color adjustment parameters. That is, the plurality of color adjustment parameters are set in a plurality of levels, and the user selects an index image with a desired tone from those based on different combinations of the color adjustment parameters of respective levels, thus setting the color adjustment parameters.

Note that the GUI shown in FIG. 1 has a combination of the RC value, GM value, and BY value as color adjustment parameters. However, the color adjustment parameters are not limited to them. For example, brightness and contrast levels, strong and weak levels of correction such as backlight correction, and the like are defined as individual color adjustment parameters, and the GUI allows the user to adjust at least two of these color adjustment parameters as a combination and to print images that have undergone color adjustment in a plurality of levels using different combinations of these parameters as a sample.

[Layout of Sample Print]

Assume that the first embodiment comprises the following two types of sample prints since there are three color adjustment parameters, i.e., the RC value, GM value, and BY value. Note that the output destination of a sample print is not limited to the printer 113. For example, a sample print may be output to an image output device such as the monitor 111 or the like so as to display a preview image.

Figure 5:
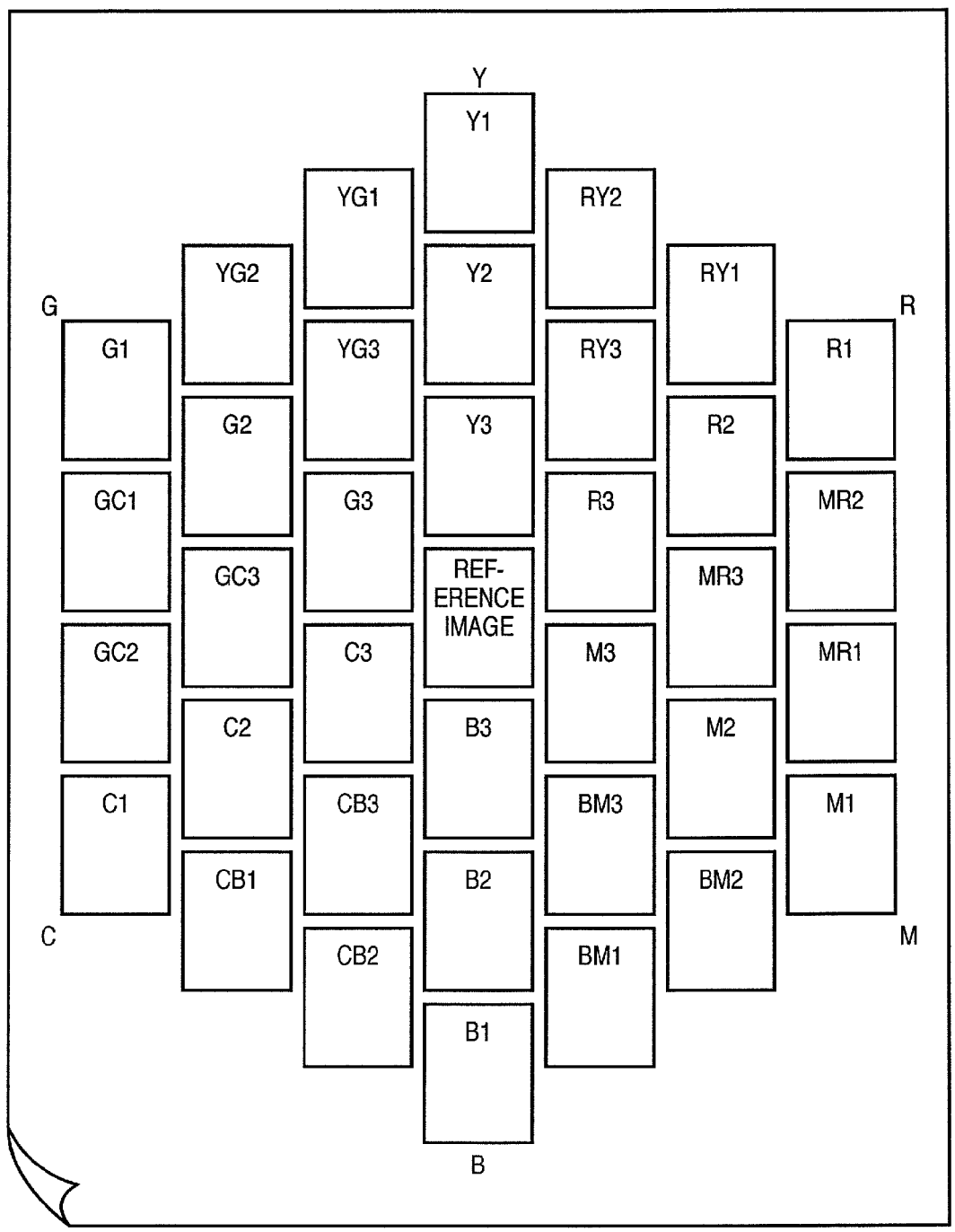
FIG. 5 is a view for explaining the format of a sample print of the first type.

FIG. 5 is a view for explaining the format of a sample print of the first type, and shows a state wherein index images are printed on one face of a print medium. As shown in FIG. 5, a reference image is arranged at nearly the center of a page, and index images are laid out in a hexagonal pattern having six hues, i.e., yellow (Y), red (R), magenta (M), blue (B), cyan (C), and green (G), as vertices. The absolute value of each color adjustment parameter increases from the reference image at nearly the center toward each vertex. Note that a symbol (e.g., Y1, CB1, or the like) assigned to each index image is an index number. In the following description, for example, an index image with symbol Xn will be referred to as "index image Xn".

Figure 6:
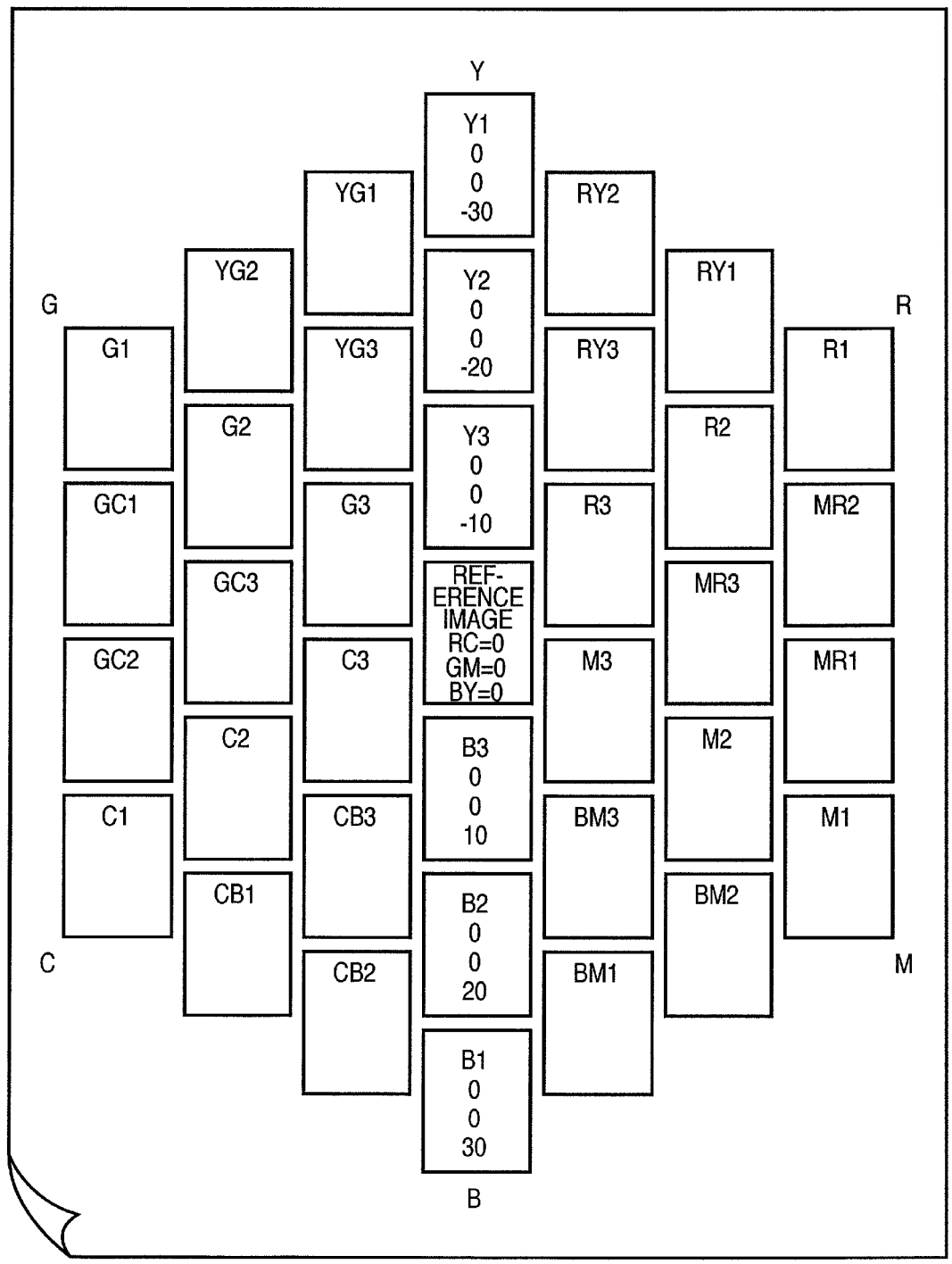
FIG. 6 is a view showing the color adjustment parameter values of a reference image and some index images.

FIG. 6 shows the color adjustment parameter values of the reference image and some index images. The reference image has a BY value="0", but index image Y3 which advances by one level from the reference image toward the Y vertex has a BY value="−10". Upon advancing one more level, index image Y2 has a BY value="−20", and index image Y1 at the Y vertex has a BY value="−30". In this way, the BY value decreases from the reference image toward the Y vertex. Conversely, upon advancing from the reference image toward the B vertex, the BY values of index images increase like "10", "20", and "30".

Note that the step value of the BY value is "10" in the example of FIG. 6, but it can be arbitrarily set. The step width of each color adjustment parameter may be predetermined or may be varied for each sample print in accordance with the tone of a reference image.

In the following description, the sample print with the hexagonal layout shown in FIG. 5 will be referred to as an "all-hue sample print". The all-hue sample print is used to determine a hue direction to execute color adjustment with respect to the reference image. In other words, the all-hue sample print is preferably used when the user wants to execute color adjustment associated with hue rather than that associated with saturation, or wants to know a change in tone upon changing hue with respect to the set color adjustment parameters.

FIG. 7 is a view for explaining the format of a sample print of the second type and shows a state wherein index images are printed on one face of a print medium. As shown in FIG. 7, a reference image is arranged at one corner of the page, and index images are laid out in a rectangular pattern having three hues (Y, R, and M in FIG. 7) as vertices. Note that the numbers of images arranged in the vertical and horizontal directions are equal to each other.

For example, when the user selects a red hue from the six hues, the reference image is arranged at the lower left corner, the R vertex is arranged at the upper right corner diagonal with respect to the reference image, and M and Y which neighbor R are arranged at the two remaining vertices. Like in the all-hue sample print, the absolute value of each color adjustment parameter increases from the reference image toward each vertex. In the following description, the sample print with the rectangular layout shown in FIG. 7 will be referred to as an "individual-hue sample print", and the sample print after selection of the red hue, as shown in FIG. 7, will be referred to as a "red-hue sample print". The individual-hue sample print is used when the user roughly determines color adjustment associated with hue, and wants to apply color adjustment associated with saturation.

On the red-hue sample print, an image arranged at the upper right corner has a largest saturation value, and the saturation value decreases with increasing distance from the image arranged at the upper right corner.

Note that upon printing, e.g., the red-hue sample print, the reference image, and index images bounded by those at the M, R, and Y vertices may be extracted from the all-hue sample print, and may undergo sample printing. However, on the individual-hue sample print, it is preferable to set a smaller step width of each color adjustment parameter than on the all-hue sample print and to express a tone change more finely. As a result, the user can set a rough goal of color adjustment associated with hue by the all-hue sample print. Then, the user can observe a tone change or saturation change in more detail using the individual-hue sample print which has the hue (hue to be adjusted), which is given as the rough goal, as an axis. The user can select an index image corresponding to appropriate color adjustment parameters from the individual-hue sample print.

Note that the case has been exemplified wherein the red hue is selected. Also, the same applies to a case wherein another hue such as yellow, cyan, or the like is selected.

In this manner, when the user wants to examine a tone change associated with hue or to apply color adjustment associated with hue, he or she uses the all-hue sample print. On the other hand, when the user wants to examine a tone change associated with saturation or to apply color adjustment associated with saturation, he or she uses the individual-hue sample print. Alternatively, the user roughly determines color adjustment associated with hue to be applied to a reference image by observing the all-hue sample print, and then explores the tone in detail by observing the individual-hue sample print to select an index image (to determine the color adjustment parameters).

Figure 8:
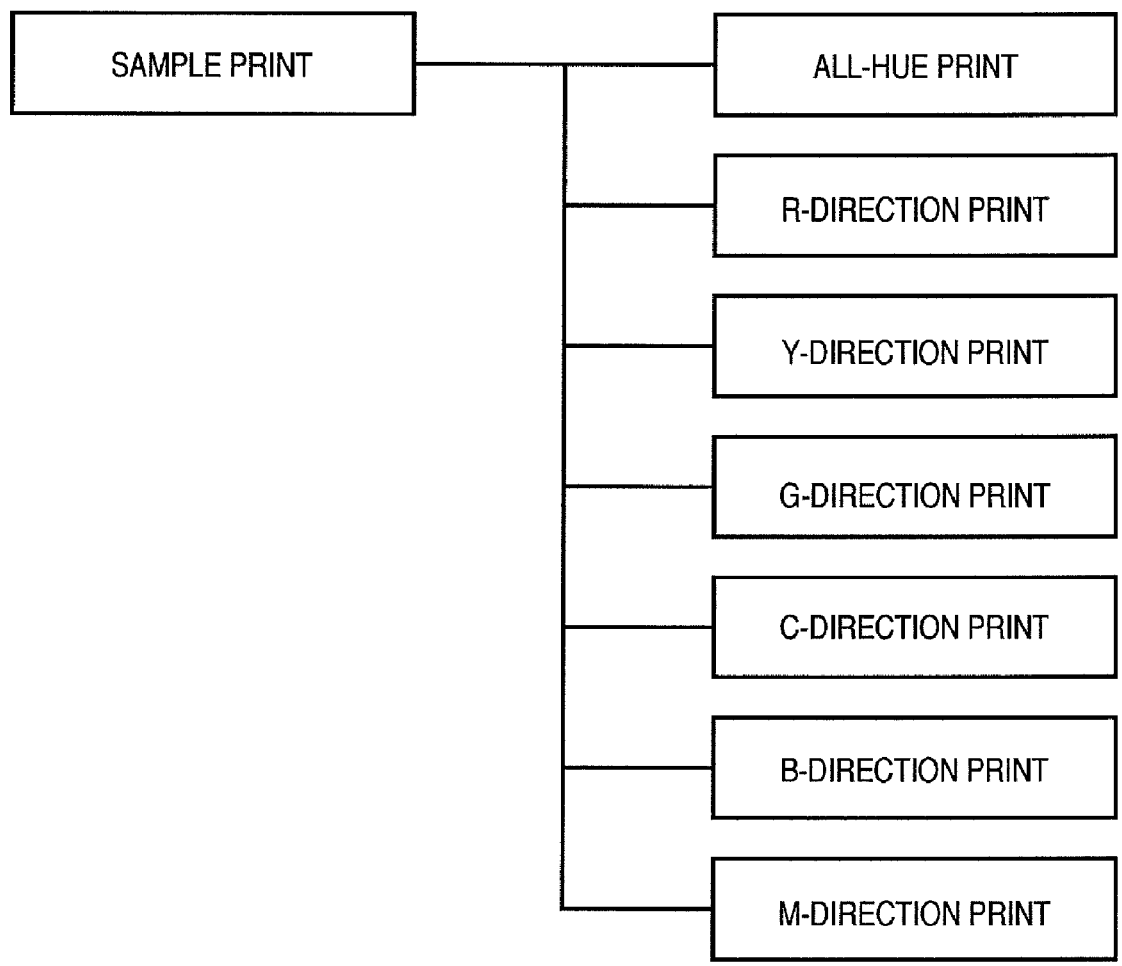
FIG. 8 shows the hierarchical structure of menus provided by a GUI.

FIG. 8 shows the hierarchical structure of menus provided by the GUI of the application software 121 or printer driver 123. Upon selecting "sample print" on a menu bar, a plurality of sub menus are displayed, as shown in FIG. 8. The user can arbitrarily select a sub menu "all-hue print" corresponding to the all-hue sample print or one of sub menus "R-direction print" to. "M-direction print" corresponding to each individual-hue sample print, and can execute the selected sub menu. Note that the user interface need not always adopt the pull-down menu form as long as it makes the user select one of a plurality of choices. For example, the user may check the all-hue sample print or one of individual-hue sample prints using a radio button to execute sample printing.

[Distribution of Color Adjustment Parameters]

The values of the color adjustment parameters of the reference image are changed to set another combination of color adjustment parameters (varied color adjustment parameters). In this case, assume that the step width between neighboring color adjustment parameter values is set in advance to be "10". If the BY value of the reference image is "0", as shown in FIG. 6, that of index image Y3 is "−10". Furthermore, the BY value of index image Y2 is "−20", and that of index image Y1 at the Y vertex is "−30". This step width remains the same even when the reference image has undergone color adjustment.

When the BY value of the reference image is set to be "−5", that of index image Y3 is "−15". Furthermore, the BY value of index image Y2 is "−25", and that of index image Y1 at the vertex is "−35".

If the absolute value of each color adjustment parameter set for the reference image is large, the value of the varied color adjustment parameter may exceed the setting range in some index images. For example, if the BY value of the reference image is set to be "−30", that of index image Y1 is "−60". However, if the setting range of the color adjustment parameter value is from −50 to +50, as shown in FIG. 1, a value whose absolute value exceeds "50" cannot be set.

Hence, when the varied color adjustment parameter value has exceeded the setting range, it may be clipped to the upper limit value (e.g., +50) or lower limit value (e.g., −50). However, the BY values of both index images Y1 and Y2 become "−50", and index images having the same BY values line up on one sample print. This is not preferable if the purpose of sample printing is considered.

To solve this problem, the first embodiment processes as follows when at least one of the three color adjustment parameters exceeds the setting range. That is, the varied color adjustment parameter value which exceeds the setting range is clipped to the upper or lower limit value, and other color adjustment parameter values are changed. In this manner, the sample print never includes index images having the same combination of color adjustment parameters.

Note that the three color adjustment parameters are respectively called first, second, and third parameters. If the first, second, and third parameters are different parameters, the first parameter may be any one of the RC value, GM value, and BY value. Likewise, if the first, second, and third parameters are different parameters, the second and third parameters may be any one of the RC value, GM value, and BY value.

Figure 9:
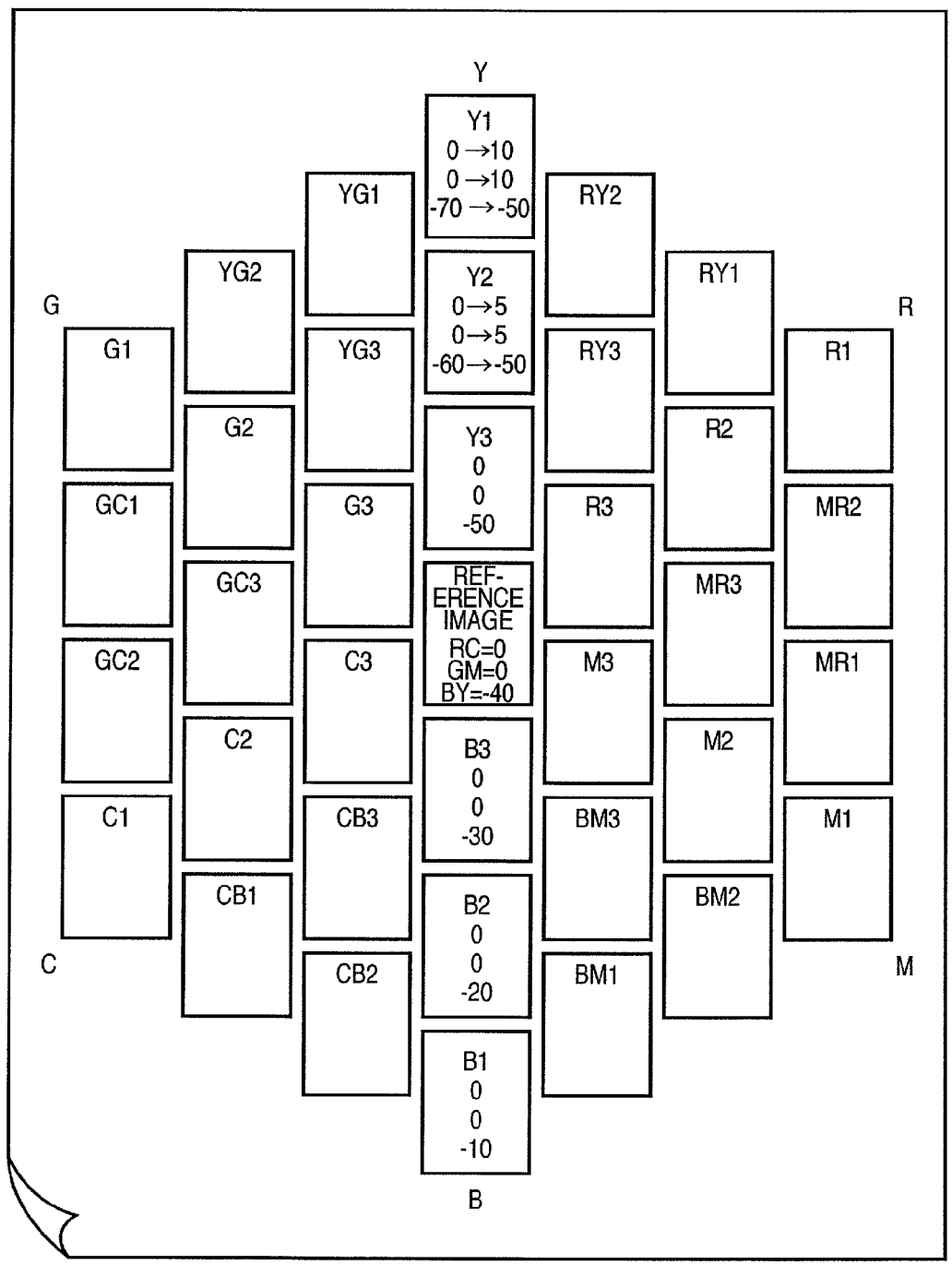
FIGS. 9 to 12 are views for explaining examples of distributions of the color adjustment parameters upon sample printing.
Figure 14:
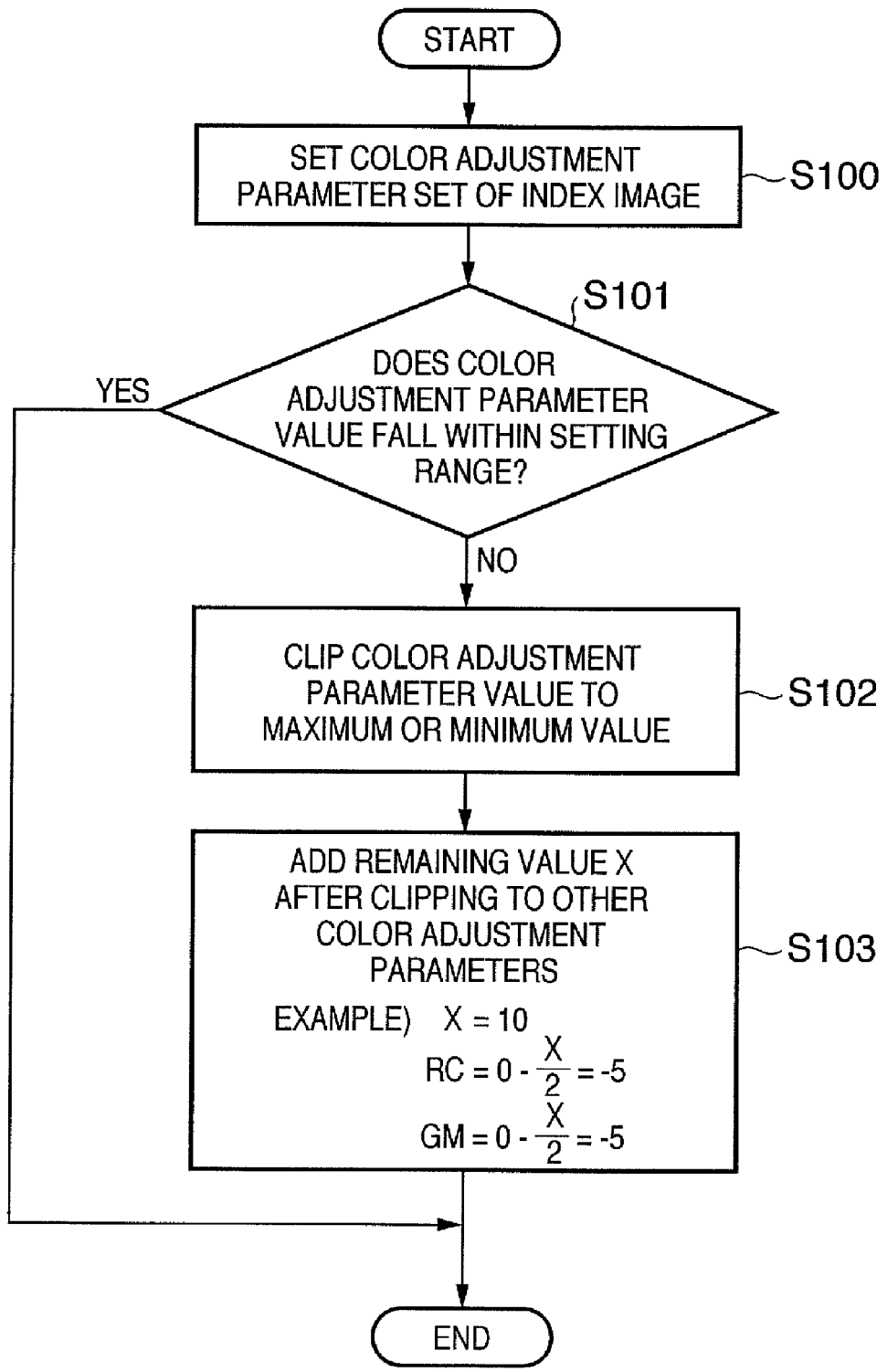
FIG. 14 is a flowchart for explaining distribution processing.

FIG. 9 is a view for explaining an example of distribution of the color adjustment parameters upon sample printing. FIG. 14 is a flowchart for explaining distribution processing, and the CPU 108 executes this processing. Note that FIG. 14 shows processing for only one index image, but the CPU 108 repeats the processing shown in FIG. 14 for all the index images.

For example, assume that the user sets the color adjustment parameter values to have an RC value=0, GM value=0, and BY value=−40, and instructs to print a sample print. In other words, the color adjustment parameters of the reference image respectively have the RC value=0, GM value=0, and BY value=−40.

In this case, as shown in FIG. 9, the varied color adjustment parameter values of index image Y3 are respectively set to have the RC value=0, GM value=0, and BY value=−50 (S100), all of which fall within the setting range (S101).

The varied color adjustment parameters of index image Y2 are set to have the RC value=0, GM value=0, and BY value=−60 (S100). In this case, the BY value is below the minimum value "−50" of the setting range (S101). Hence, the BY value of index image Y2 is clipped to "−50" (S102), and the remaining value "−10" of the BY value after clipping is distributed to the RC value and GM value to set the RC value=5 and GM value=5 (S103). Increases in RC value and GM value increase the ratios of the R and G color components, and the image is emphasized in the direction of the Y-hue axis. Likewise, of the varied color adjustment parameters of index image Y1, the BY value is clipped to "−50" (S102), and the remaining value "−20" of the BY value after clipping is distributed to the RC value and GM value to set the RC value=10 and GM value=10 (S103).

When the BY value has reached its lower limit value, index images Y1 and Y2 cannot be emphasized (color-adjusted) in the direction of the Y-hue axis by increasing the BY value. Hence, by increasing the RC value and GM value in correspondence with the remaining value of the BY value after clipping, index images Y1 and Y2 are emphasized (color-adjusted) in the direction of the Y-hue axis relative to index image Y3.

The same applies to other tones. For example, when the RC value exceeds "+50" of the setting range, the GM value and BY value decrease in correspondence with the remaining value of the RC value clipped to "+50" to decrease the ratios of the G and B color components, thus emphasizing (color-adjusting) an image in the direction of the R-hue axis.

Figure 10:
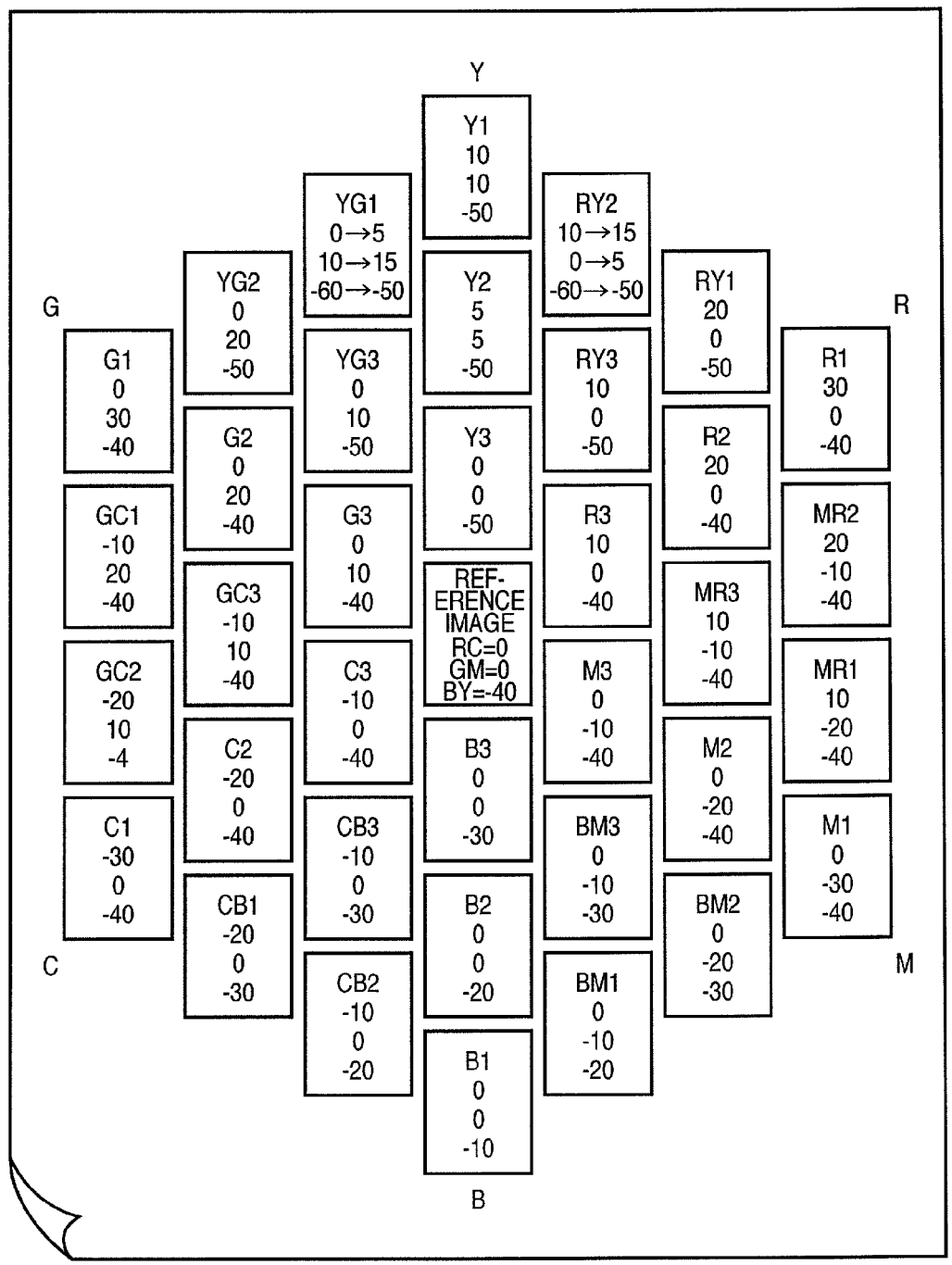

FIG. 10 is a view for explaining an example of distribution of varied color adjustment parameters upon sample printing, and shows the varied color adjustment parameters of respective index image when the BY value exceeds the setting range, as in FIG. 9.

For example, the RC value increases in increments of the step width by fixing the GM value and BY value along the R-hue axis (reference image→index image R3→index image R2→index image R1). Likewise, the GM value increases in increments of the step width by fixing the RC value and BY value along the G-hue axis (reference image→index image G3→index image G2→index image G1). Similarly, the BY value of index images on the B-hue axis increases in increments of the step width from the reference image (center) toward the outermost image, and the GM value and RC value of index images on the M- and C-hue axes decrease in decrements of the step width from the reference image (center) toward the outermost images.

Index images sandwiched between neighboring hue axes are set with intermediate varied parameter values of those of index images on the respective hue axes, as shown in FIG. 10. The RC value of index image RY1 is set to "20" by subtracting the step width from that of index image R1, and the BY value is set to "−50" by subtracting the step width from that of index image R1. Likewise, by subtracting the step width from the RC value and BY value of index image RY2, the RC value=10 and BY value=−60, and the BY value drops below the setting range in this case. Like in index images Y1 and Y2, the BY value of index image RY2 is clipped to "−50", and the remaining value after clipping is added to the RC value and GM value to obtain the RC value=15 and GM value=5. The step width is subtracted from the RC value of index image RY3 with respect to index image R3 to obtain "10", and is also subtracted from the BY value to obtain "−50". The same applies to index images YGn, BMn, and CBn (n=1, 2, 3).

Upon clipping the varied color adjustment parameters when the values of the varied color adjustment parameters exceed the settable range on the sample print, a plurality of index images with the same tone exist, thus impairing the functions of the sample print. When the varied color adjustment parameters are clipped, as described above, the plurality of color adjustment parameters are adjusted in conjunction with each other to prevent the above bad effect, and the sample print with good visual tone balance can be provided. Note that the adjustment that interlocks the plurality of color adjustment parameters can be applied to the individual-hue sample print shown in FIG. 7.

The individual-hue sample print has a format obtained by extracting some index images from the all-hue sample print. Therefore, as described above, it is preferable to set the smaller step width of the color adjustment parameters of the individual-hue sample print than the all-hue sample print and to express the tone change more finely. For example, the number of index images that can be printed on the individual-hue sample print is approximately four times that of the all-hue sample print. Therefore, upon reception of an all-hue sample print instruction, the color adjustment parameters may be changed by setting the step width=10, and upon reception of an individual-hue sample print instruction, the color adjustment parameters may be set by setting the step width=2 to 3.

[Brightness Adjustment]

Upon adjusting only one color adjustment parameter, only a color signal corresponding to that color adjustment parameter of RGB signals is processed. For example, when only the setting of the RC value is changed, only the processing for the R signal is changed, and those for the G and B signals remain unchanged. As a result, not only the tone but also the brightness of an image are changed. To prevent this problem, when, for example, the RC value is increased, the GM value and BY values are decreased in accordance with the increment of the R signal so that a luminance value Y=0.3R+0.6G+0.1B remains unchanged. In this way, even when the reference image has undergone color adjustment, the brightness values of all index images on the sample print can be maintained.

[Holding Method of Color Adjustment Parameters]

The absolute values of the color adjustment parameters may be held for respective index images including the reference image in an area assured on a memory such as the RAM 109 or the like. As another holding method, the color adjustment parameters of the reference image may be held, and the varied color adjustment parameters of other index images may be held as relative values (differences) to the color adjustment parameters of the reference image.

Figure 11:
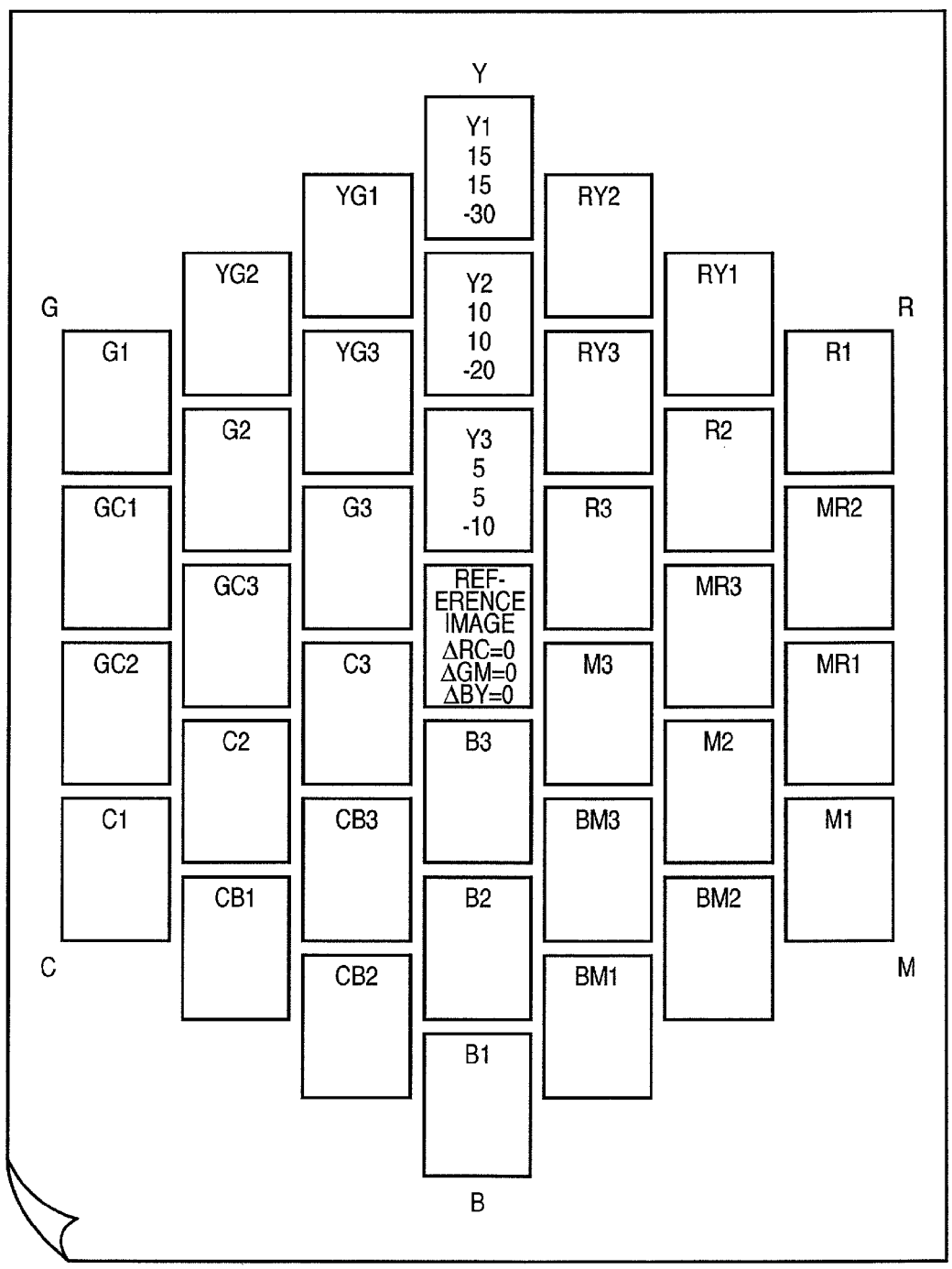

FIG. 11 is a view for explaining an example of distribution of the color adjustment parameters upon sample printing, and shows the differences of the varied color adjustment parameters (to be simply referred to as differences hereinafter) of index images on the Y-hue axis. All the differences, i.e., the $\Delta RC$, $\Delta GM$, and $\Delta BY$ values of the reference image are obviously="0". The differences of index image Y3 are set to have the $\Delta RC$ value=5, $\Delta GM$ value=5, and $\Delta BY$ value=−10, and those of index image Y2 are set to have the $\Delta RC$ value=10, $\Delta GM$ value=10, and $\Delta BY$ value=−20.

Figure 12:
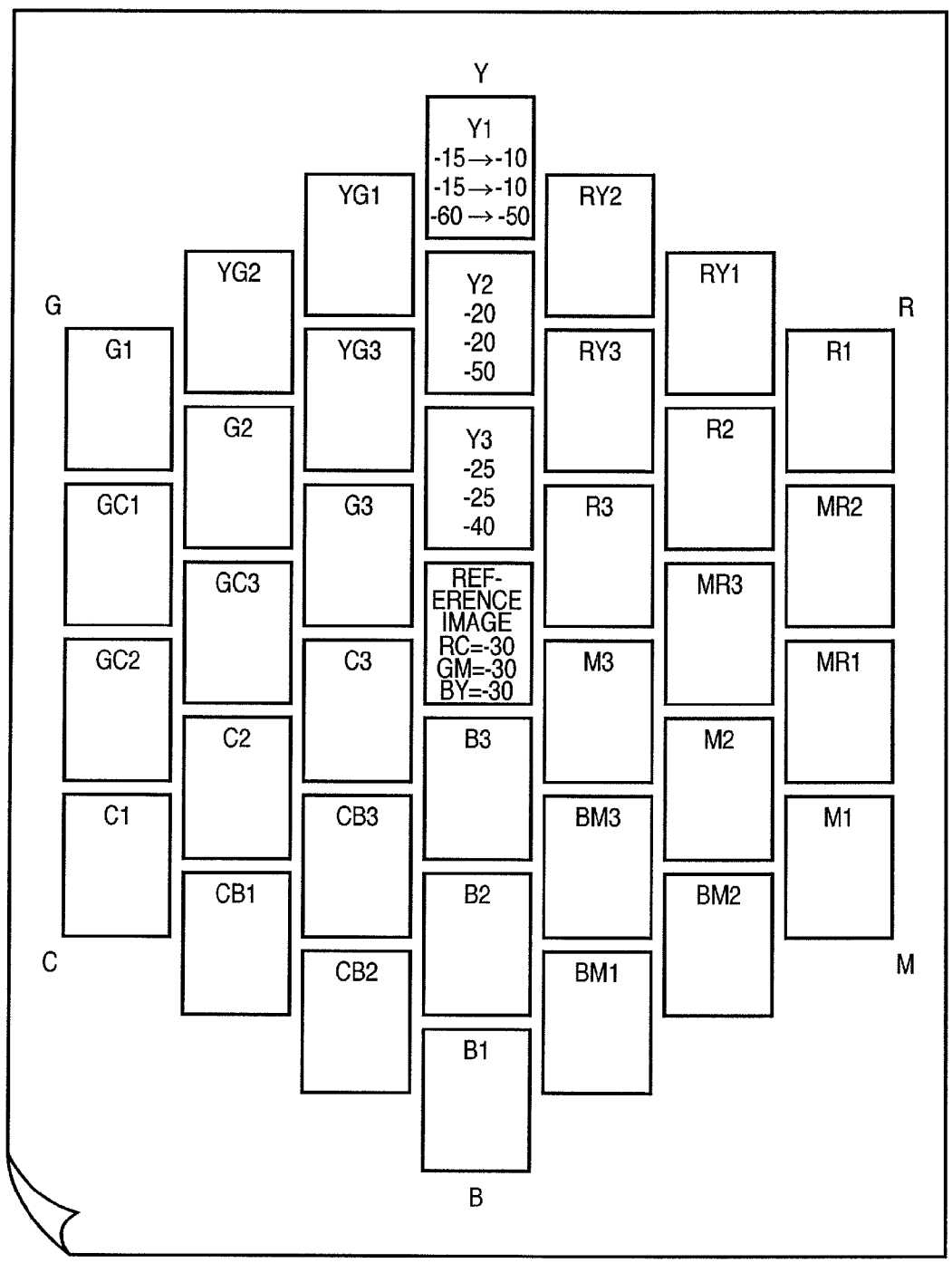

Actual varied color adjustment parameters have values obtained by adding the differences to the values of the color adjustment parameters of the reference image. For example, assuming that the color adjustment parameters of the reference image are respectively the RC value=−30, GM value=−30, and BY value=−30, the color adjustment parameters of the reference image and index images shown in FIG. 11 are as shown in FIG. 12. That is, the varied color adjustment parameters of index image Y3 are the RC value=−30+5=−25, GM value=−30+5=−25, and BY value=−30−10=−40. Also, the varied color adjustment parameters of index image Y3 are the RC value=−30+10=−20, GM value=−30+10=−20, and BY value=−30−20=−50.

In this case as well, the values of the varied color adjustment parameters may exceed the setting range. As shown in FIG. 12, the values of the varied color adjustment parameters of index images Y3 and Y2 fall within the settable range (−50 to +50). However, the BY value of index image Y1 is −30−30=−60, and exceeds the settable range. In the same manner as in the above description, as shown in FIG. 12, the BY value of index image Y1 which exceeds the settable range is clipped to "−50", and the remaining value "−10" after clipping is distributed to other color adjustment parameters. As a result, the varied color adjustment parameters of index image Y1 are the RC value=−30+15+5=−10, GM value=−30+15+5=−10, and BY value=−50.

The adjustment that interlocks the plurality of color adjustment parameters can also be applied to the individual-hue sample print shown in FIG. 7.

[Distribution of Color Adjustment Parameters in Consideration of Color Difference]

In the above example of the sample print, the color adjustment parameter values are changed by the unique step width (e.g., 10) from the reference image (center) toward outermost images. However, a method of changing the color adjustment parameters so that neighboring index images have a uniform color difference $\Delta E$ on the chromaticity coordinate system may be used.

For example, on the all-hue sample print shown in FIG. 5, neighboring index images have a predetermined color difference in each hue axis direction. As a result, since the color difference $\Delta E$ uniformly changes in accordance with the distance between neighboring index images, the user can observe as if the tones of index images change smoothly due to the human visual sense.

A method of calculating the color adjustment parameters to have a uniform color difference $\Delta E$ between neighboring index images in a case wherein an sRGB space is assumed on the hexagonal layout shown in FIG. 5 will be described below.

Figure 15:
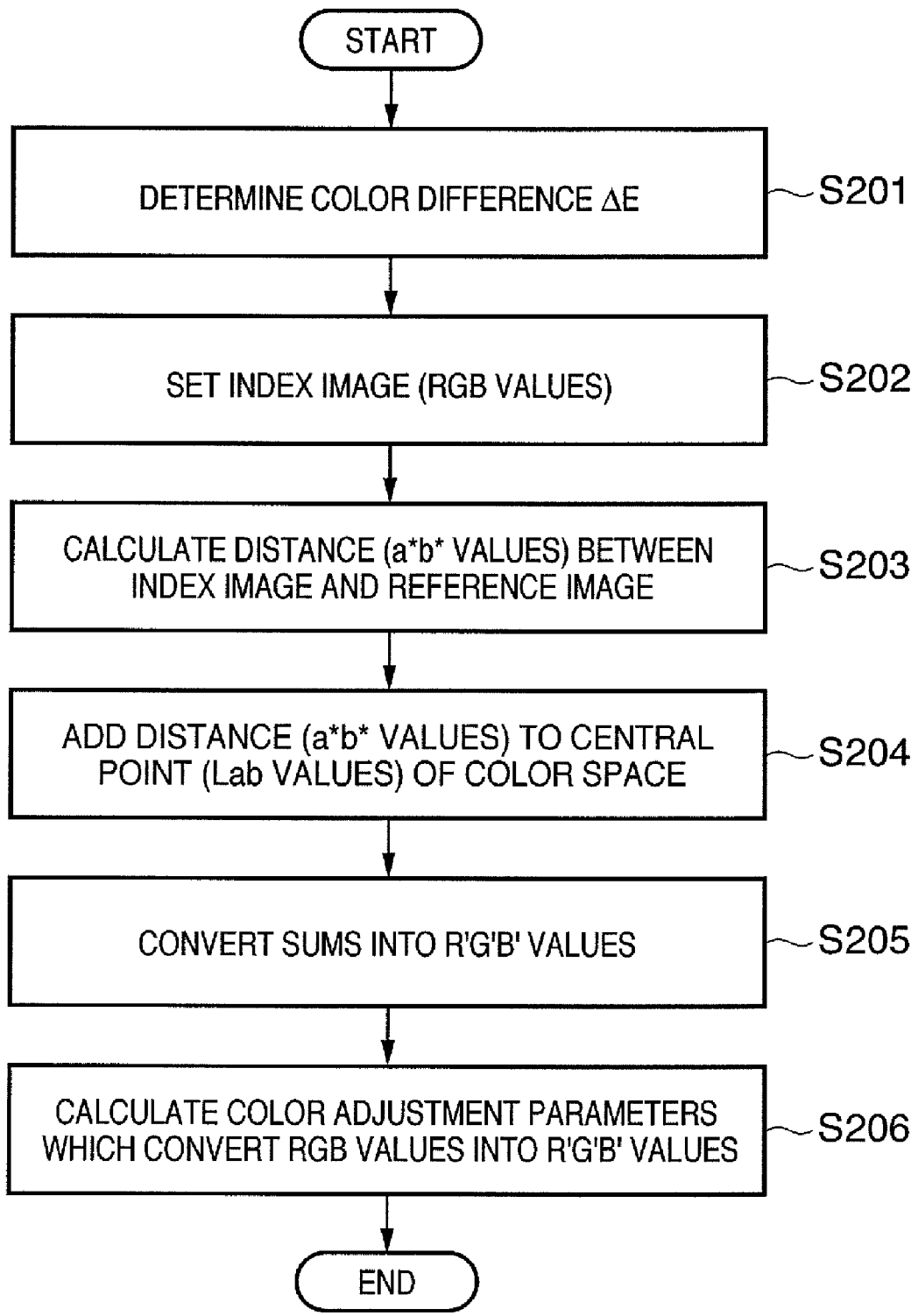
FIG. 15 is a flowchart for explaining the method of setting color adjustment parameters to have a uniform color difference $\Delta E$.

FIG. 15 is a flowchart for explaining the method of setting the color adjustment parameters to have a uniform color difference $\Delta E$, and the CPU 108 executes this processing.

The CPU 108 determines a color difference $\Delta E$ between neighboring index images (S201). For example, the CPU 108 may set a color difference $\Delta E=3$ between neighboring index images. The setting value of the color difference $\Delta E$ is variable, but it is set to be equal to or larger than a value that allows the human visual sense to identify the color difference.

The CPU 108 sets index images (RGB values) separated from the reference image by $\Delta E \times n$ (n is a natural number) as many as required (S202). The CPU 108 then calculates the distance between the reference image and an arbitrary index image as $a^*b^*$ values ($\sqrt{(a^{*2}+b^{*2})}$) on the chromaticity coordinate system (S203)

For example, the CPU 108 converts the central pint (R, G, B)=(128, 128, 128) of the color space into Lab values on the sRGB color space, and adds the previously calculated distance $a^*b^*$ values of the arbitrary index image to them (S204). The CPU 108 then converts the sums into RGB signal values (R'G'B' values) (S205).

The CPU 108 calculates an RC value that converts R into R', a GM value that converts G into G', and a BY value that converts B into B', and sets them as varied color adjustment parameters of the index image of interest (S206). The CPU 108 adjusts the reference image using the set varied color adjustment parameters, and arranges the image as the arrangement result at an appropriate position as the index image of interest.

Note that the CPU 108 calculates the RC values, SM values, and BY values which convert RGB values into R'S'B' values in advance for all the possible ranges of the color adjustment parameters. When the calculation results are held as a table of the application software 121 or printer driver 123, the color adjustment parameters can be calculated in a short period of time. Of course, the above table may be prepared for, e.g., the sRGB space and printer gamut in place of the possible ranges of the color adjustment parameters.

Note that the color space of a printer may be used in place of the sRGB space. In this way, the tone of the sample print expresses the color difference $\Delta E$ more faithfully. The representative point as the center of the color space is not limited to (R, G, B)=(128, 128, 128), and other points may be used. In the description of the above example, the color difference $\Delta E$ on the chromaticity coordinate system is used. Alternatively, RGB signals may be converted into YCbCr signals, and a color difference $\Delta CbCr$ on the CbCr plane or a color difference $\Delta RGB$ on the RGB space may be used.

[Modification]

The all-hue sample print is not limited to the hexagonal layout, but may be varied in correspondence with the number of color adjustment parameters. In the above description, since three color adjustment parameters are used, a hexagon in which the reference image is arranged at the center to have these color adjustment parameters as axes is selected. However, if the number of color adjustment parameters is two, a rectangle may be used, and if it is four, an octagon may be used. That is, if the number of color adjustment parameters is N, a 2N-gonal layout which is twice the number of color adjustment parameters is preferably used. The reference image may be arranged at the center of the layout (that of a polygon), and index images whose color adjustment parameters are changed toward respective vertices may be arranged.

The layout of each individual-hue sample print can also be changed. In the above description, since three color adjustment parameters are used, the hues (directions of the axes) are narrowed down to have these parameters as axes, so a rectangle in which the reference image is arranged at a corner is selected. However, if the number of color adjustment parameters is two, a triangle may be used.

In order to present the color adjustment parameters of index images, the RC value, GM value, and BY value are printed under each index image. As a result, the user can search for an index image (or an image group) indicating a desired tone from index images, and can finely adjust the color adjustment parameters with reference to the color adjustment parameter values printed under that (or those) index image (or images).

Furthermore, in the description of the above example, the application software 121 or printer driver 123 sets the color adjustment parameters. However, some digital cameras 112 which perform direct print using the printer 113 without the intervention of any personal computer are also commercially available. In this case, a GUI used to set color adjustment parameters is displayed on the monitor of the digital camera 112 or printer 113, and the user sets the color adjustment parameters and inputs a sample print instruction using that GUI.

In this way, two different layouts, i.e., a layout on which the reference image is arranged at the center, and a layout on which it is arranged at a corner are prepared as sample prints. When the user wants to examine a tone change associated with hue or to apply color adjustment in association with hue, he or she uses the layout on which the reference image is arranged at the center. When the user wants to examine a tone change associated with saturation or to apply color adjustment in association with saturation, he or she uses the layout on which the reference image is arranged at the corner. Hence, the user can selectively use the layouts according to the use purpose.

When the color adjustment parameter value of an arbitrary index image exceeds the settable range on the sample print, a sample print with different tones of all index images can be obtained by adjusting the plurality of color adjustment parameters in conjunction with each other.

Second Embodiment

Image processing according to the second embodiment of the present invention will be described below. Note that the same reference numerals in the second embodiment denote the same parts as in the first embodiment, and a detailed description thereof will be omitted.

The first embodiment has explained the method of changing the tones of all index images on the sample print by adjusting a plurality of color adjustment parameters in conjunction with each other when the color adjustment parameter value exceeds the settable range on the sample print. The second embodiment will explain a method of avoiding the bad effect that the color adjustment parameter value exceeds the settable range in accordance with the color space.

For example, the sRGB space or the printer color space (RGB space) is converted into the chromaticity coordinate system. Then, as shown in FIG. 13, color differences $\Delta Ex$ between the reference image and outermost index images are calculated. Then, an index image with a minimum color difference $\Delta Ex$ is detected. In the example of FIG. 13, index image R1 is an outermost index image with the minimum color difference $\Delta Ex$. That is, the color difference $\Delta Ex$ between the reference image and index image R1 is calculated.

Next, the color difference $\Delta Ex$ is equally divided by the number $N-1$ of index images (distance) on one side of the sample print. In the example shown in FIG. 13, since the number of index images on one side is four, the distance=3, and $\Delta Ex/3$ is to be calculated. Finally, in the method described in [distribution of color adjustment parameters in consideration of color difference], the varied color adjustment parameters of respective index images are set to have $\Delta E=\Delta Ex/(N-1)$.

In this way, by distributing the color adjustment parameters based on an index image which has a minimum color difference from the reference image, the values of the varied color adjustment parameters never exceed the settable range. However, in case of equal division, a lower limit must be set for the color difference $\Delta E$ between neighboring index images. That is, when the color difference between the reference image and outermost index image is small, when the number of index images on one side is large, and so forth, the color difference $\Delta E$ between neighboring index images may become very small.

Hence, a value that allows the human visual sense to identify the color difference is set as a lower limit value of the color difference $\Delta E$. When the color difference $\Delta E$ becomes less than the lower limit value, a warning message may be displayed on a GUI to re-set the color adjustment parameters of the reference image, or the number of index images on one side is reduced upon sample printing after the warning message may be displayed on the GUI.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-380173, filed Dec. 28, 2005, which is hereby incorporated by reference herein in its entirety.

What is claimed is:

1. An image processing apparatus comprising:
an input section, arranged to input a reference parameter set of color processing;
a setting section, arranged to set a plurality of varied parameter sets of the color processing obtained by changing parameters of the reference parameter set by a predetermined step width to have the parameters as the center;
an image processor, arranged to generate a reference image by applying the color processing using the reference parameter set to an image, and a plurality of index images by applying the color processing using the plurality of varied parameter sets to the image; and
a layout section, arranged to generate a layout image by arranging the reference image and the plurality of index images on one page so as to output image data of the layout image to an image output device,
wherein the layout section provides for a first layout where the reference image is arranged at nearly the center of the page, and the plurality of index images are arranged around the reference image in accordance with the varied parameters, and a second layout where the reference image is arranged at a corner of the page, and the plurality of index images are arranged between the corner and other corners of the page in accordance with the varied parameters,
wherein the layout section generates the layout image having the second layout after a specific hue is selected, and
wherein the first layout and the second layout are selectively used, and the step width of the plurality of varied parameter sets for the second layout is smaller than that for the first layout for the setting section.

2. The apparatus according to claim 1, wherein in a case where one parameter of the varied parameter set falls outside a settable range, the setting section clips that parameter to a maximum value or a minimum value of the settable range, and distributes a remaining value after clipping to other parameters of the varied parameter set.

3. The apparatus according to claim 1, wherein the first layout and the second layout have axes as many as the number of parameters in the parameter set.

4. The apparatus according to claim 1, wherein the setting section sets the plurality of varied parameter sets by changing the parameters of the reference parameter set so that color differences between the reference image and index images which neighbor the reference image and color differences between the neighboring index images become approximately equal to each other.

5. The apparatus according to claim 4, wherein the setting section sets the plurality of varied parameter sets using a table which holds arithmetic results of parameter sets having approximately equal color differences in association with the settable range of the varied parameter set, an sRGB space, or a color gamut of the image output device.

6. The apparatus according to claim 4, further comprising a resetting section, arranged to detect an index image which is located at an outermost position of the layout and has a minimum color difference from the reference image, and to reset the plurality of varied parameter sets based on a quotient obtained by dividing the color difference by a distance between that index image and the reference image.

7. The apparatus according to claim 6, wherein in a case where the quotient is not more than a threshold, the resetting section uses a predetermined value in place of the quotient.

8. An image processing method comprising:
using a processor to perform the steps of:
inputting a reference parameter set of color processing;
setting a plurality of varied parameter sets of the color processing obtained by changing parameters of the reference parameter set by a predetermined step width to have the parameters as the center;
generating a reference image by applying the color processing using the reference parameter set to an image, and a plurality of index images by applying the color processing using the plurality of varied parameter sets to the image; and
generating a layout image by arranging the reference image and the plurality of index images on one page so as to output image data of the layout image to an image output device,
wherein the generating the layout image step provides for a first layout where the reference image is arranged at nearly the center of the page, and the plurality of index images are arranged around the reference image in accordance with the varied parameters, and a second layout where the reference image is arranged at a corner of the page, and the plurality of index images are arranged between the corner and other corners of the page in accordance with the varied parameters,
wherein the layout image having the second layout is generated after a specific hue is selected, and
wherein the first layout and the second layout are selectively used, and the step width of the plurality of varied parameter sets for the second layout is smaller than that for the first layout for the setting step.

9. A non-transitory computer readable medium storing a computer-executable program for causing a computer to perform an image processing method, the method comprising the steps of:
inputting a reference parameter set of color processing;
setting a plurality of varied parameter sets of the color processing obtained by changing parameters of the reference parameter set by a predetermined step width to have the parameters as the center;
generating a reference image by applying the color processing using the reference parameter set to an image, and a plurality of index images by applying the color processing using the plurality of varied parameter sets to the image; and generating a layout image by arranging the reference image and the plurality of index images on one page so as to output image data of the layout image to an image output device, wherein the generating the layout image step provides for a first layout where the reference image is arranged at nearly the center of the page, and the plurality of index images are arranged around the reference image in accordance with the varied parameters, and a second layout where the reference image is arranged at a corner of the page, and the plurality of index images are arranged between the corner and other corners of the page in accordance with the varied parameters, wherein the layout image having the second layout is generated after a specific hue is selected, and wherein the first layout and the second layout are selectively used, and the step width of the plurality of varied parameter sets for the second layout is smaller than that for the first layout for the setting step.

10. An image processing method of outputting a plurality of images which undergo color processing using a plurality of different parameter sets as an output image, the method comprising:

using a processor to perform the steps of:

parallelly outputting a reference image, and plural images which have different parameter sets of the color processing from the reference image and which are arranged around the reference image, as the output image; and parallelly outputting, in a case that a specific hue is selected, the reference image which is arranged at a corner of the output image, and plural images which have different parameter sets of the color processing from the reference image and which are arranged between the corner and other corners, wherein a step width of the parameter sets between neighboring images in the second outputting step is smaller than a step width between neighboring images in the first outputting step.

11. The method according to claim 10, wherein in a case where a first parameter included in the parameter set exceeds a predetermined range, the first parameter is limited to fall within the predetermined range, and a second parameter which is included in the parameter set and is different from the first parameter is adjusted.

12. An image processing apparatus for outputting a plurality of images which undergo color processing using a plurality of different parameter sets as an output image, comprising:

a first output section, arranged to parallelly output a reference image, and plural images which have different parameter sets of the color processing from the reference image and which are arranged around the reference image, as the output image; and a second output section, arranged to parallelly output, in a case that a specific hue is selected, the reference image which is arranged at a corner of the output image, and plural images which have different parameter sets of the color processing from the reference image and which are arranged between the corner and other corners, wherein a step width of the parameter sets between neighboring images in the second output section is smaller than a step width between neighboring images in the first output section.

13. The apparatus according to claim 12, further comprising a controller, arranged to limit, in a case where a first parameter included in the parameter set exceeds a predetermined range, the first parameter to fall within the predetermined range, and to adjust a second parameter which is included in the parameter set and is different from the first parameter.

14. A non-transitory computer readable medium storing a computer-executable program for causing a computer to perform an image processing method of outputting a plurality of images which undergo color processing using a plurality of different parameter sets as an output image, the method comprising the steps of:

parallelly outputting a reference image, and plural images which have different parameter sets of the color processing from the reference image and which are arranged around the reference image, as the output image; and parallelly outputting, in a case that a specific hue is selected, the reference image which is arranged at a corner of the output image, and plural images which have different parameter sets of the color processing from the reference image and which are arranged between the corner and other corners, wherein a step width of the parameter sets between neighboring images in the second outputting step is smaller than a step width between neighboring images in the first outputting step.

* * * * *